United States Patent [19]
Liang et al.

[11] 3,837,920
[45] Sept. 24, 1974

[54] A BATTERY CONTAINING A SOLID ELECTROLYTE HAVING CATIONIC DEFECTS

[75] Inventors: Charles C. Liang, Andover; Carl R. Schlaikjer, Arlington, both of Mass.

[73] Assignee: P. R. Mallory & Co., Inc., Indianapolis, Ind.

[22] Filed: July 9, 1971

[21] Appl. No.: 161,016

[52] U.S. Cl. .................................. 136/83, 136/153
[51] Int. Cl. .................................... H01m 11/00
[58] Field of Search ............. 136/6 N, 6 F, 83, 153; 252/62.2

[56] References Cited
UNITED STATES PATENTS

| | | | |
|---|---|---|---|
| 1,662,866 | 3/1928 | Salazar | 136/153 |
| 2,696,513 | 12/1954 | Lehovec | 136/83 |
| 2,766,315 | 10/1956 | Jobe | 136/153 |
| 3,547,700 | 12/1970 | Swindelk | 136/6 |
| 3,591,418 | 7/1971 | Sutula | 136/83 T |
| 3,607,407 | 9/1971 | Adams | 136/153 |

OTHER PUBLICATIONS

Phase Diagrams For Ceramists, The American Ceramic Society, Inc. 1964, page 382.

Primary Examiner—Winston A. Douglas
Assistant Examiner—H. A. Feeley
Attorney, Agent, or Firm—Robert Levine

[57] ABSTRACT

A solid electrolyte material comprises an alkali metal halide solid electrolyte matrix containing an additive therein for introducing defects into the matrix for increasing the ionic conductivity of the material.

6 Claims, 2 Drawing Figures

POLARIZATION CURVE OF A Li/LiI (CaO)/PbI$_2$ TEST CELL

A BATTERY CONTAINING A SOLID ELECTROLYTE HAVING CATIONIC DEFECTS

This invention relates to a new kind of solid electrolyte material for use in high voltage solid electrolyte battery systems.

Miniaturization in electronics has been rapidly increasing in recent years and has resulted in increased demand for special power sources characterized by volume and weight comparable to those of electronic components employed in the circuitry. Success in meeting this demand has been achieved by employing solid electrolyte cells. Apart from the advantage of miniaturization, solid electrolyte cells and batteries permit great flexibility in design and possess extremely long shelf-life of the order to 5 to 10 years.

The solid electrolytes employed in solid state cells are ionic conductors which facilitate the ionic flow during the operation of the solid state cells. The ionic conductivity of the solid electrolyte is one of the major factors which determine the performance of any given cell.

It has been found that solid state battery systems may have low conductivity of the solid electrolyte which may result in high internal resistance and low current capability of the solid electrolyte cell.

It is threfore an object of the present invention to provide a solid electrolyte of increased conductivity.

It is another object of the present invention to provide an improved solid electrolyte material being comprised of an alkali metal halide solid electrolyte matrix containing one or more additives for introducing defects into the solid electrolyte matrix to increase the ionic conductivity of said solid electrolyte.

It is a further object of the present invention to provide an improved solid electrolyte battery comprised of an anode, a cathode, and a solid electrolyte matrix containing one or more additives for introducing defects into the solid electrolyte matrix to increase the ionic conductivity of the solid electrolyte.

It is another object of the present invention to provide a solid electrolyte battery comprised of an alkali metal anode such as lithium; with a solid electrolyte such as lithium iodide matrix containing one or more additives to increase the ionic conductivity; and with a cathode mixture consisting of $PbI_2$, the electrolyte, and Pb or a cathode mixture consisting of $SnI_2$, the electrolyte and Sn or a cathode mixture consisting of CuI, the electrolyte and Cu or a cathode mixture consisting of heavy metal iodide, the electrolyte and an electronic conductor.

Still another object of the present invention is to provide a primary cell including a solid electrolyte separator.

Another object is to provide a solid electrolyte matrix containing one or more additives to increase the ionic conductivity.

Other objects of the invention will become apparent from the following description:

Generally speaking, the present invention provides a new battery system in which the problem of solid electrolyte high internal resistance and low current capability is substantially reduced. This substantial reduction is the direct result of the presence, in the battery, of a novel solid electrolyte material comprised of an alkali metal halide matrix containing up to 20 mole percent of one or more additives for introducing defects into the solid electrolyte to increase the ionic conductivity, said additive being an ionic compound with a cation having an oxidation state higher than +1. Representative examples of additives are $CaI_2$, CaO, $CaCl_2$, $BaI_2$, and BaO.

In a high voltage solid electrolyte battery system employing lithium anode, suitable solid electrolyte are the ionically conductive, electronically insulative lithium compounds. Among all the simple ionic compounds of lithium, lithium iodide is the most conductive compound having a conductivity of about $10^{-7}$ ohm$^{-1}$ cm$^{-1}$ at room temperature. However the solid cells of the Li/LiI cathode systems can only deliver current densities of 1 $ua$/cm$^2$ or less without any appreciable IR loss.

It has been discovered that the conductivity of an alkali metal halide matrix can be substantially increased by the addition thereto of one or more additives which will introduce defects into the solid electrolyte matrix. The additive compounds should be ionic compounds with cations having oxidation states higher than +1. The net effect of the additives is to improve the conductivity by means of the cationic defects introduced into the solid electrolyte matrix.

It has also been discovered that since the conductivity of an alkali metal halide solid electrolyte is due to the alkali metal ion, that the conductivity of the solid electrolyte can be substantially increased by the addition of up to about 20 mole percent of the following additives: $CaI_2$, CaO, $CaCl_2$, $BaI_2$, BaO, $BeI_2$, $MgI_2$, $MgCl_2$, $BaCl_2$, $SrI_2$, $SrCl_2$, $LaI_3$, $CeI_3$, CaS, and BaS, etc.

EXAMPLE 1

A mixture of LiI and CaO with a mole ratio of 99 to 1 was ground into a powder which was then heated at a temperature ranging between 500° to 700°C for a period of 5 minutes to several hours. The molten LiI containing the additive was quenched to room temperature and ground into a fine powder. A pellet of 0.05 cm thickness was formed by pressing the powder in a steel die under a pressure of 50,000 psi.

Figure 1:
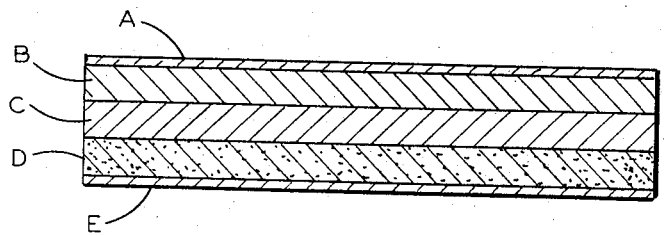
FIG. 1 is a cross-section of a test cell structure of the present invention.

A test cell was constructed according to the structure of FIG. 1 with A being an anode current collector made of steel, with B being the anode, with C being the solid electrolyte, with D being the cathode, and with E being the cathode current collector made of lead. The system was as follows:

(1)
| Li Anode | /LiI containing 1 mole % CaO/ Electrolyte | ($PbI_2$ + Electrolyte + Pb) Cathode |

Figure 2:
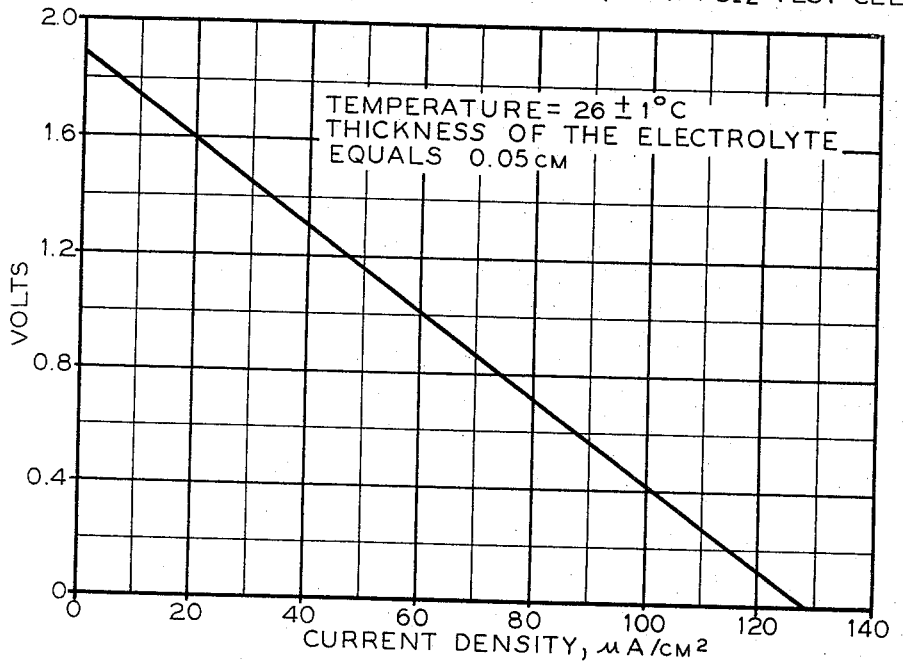
FIG. 2 is a polarization curve of the test cell of Example 1.

(1) A mixture of $PbI_2$, electrolyte, and Pb powder. This cell was tested; the conductivity of the electrolyte was found to be $(3 \pm 1) \times 10^{-6}$ ohm$^{-1}$ cm$^{-1}$. The polarization curve of this test cell in FIG. 2 shows that the internal impedance is primarily due to the electrolyte. The fact that the observed open circuit voltage of the cell, $1.88 \pm 0.01$ volts, agrees well with the theoretical value 1.87 volts and the fact that the observed IR loss agree with the value calculated from the conductivity of the electrolyte indicate that the electrolyte is practically a purely ionic conductor of negligible electronic conductivity and suitable for solid electrolyte battery systems.

EXAMPLE 2

A solid electrolyte pellet consisting of LiI containing 1 mole % $CaI_2$, was prepared according to the procedure of Example 1.

A test cell was made according to the following system,

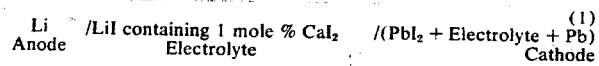

(1) A mixture of $PbI_2$, electrolyte, and Pb powder. This cell was tested; the conductivity was found to be $(8 \pm 2) \times 10^{-6}$ ohm$^{-1}$ cm$^{-1}$. This electrolyte is practically a purely ionic conductor of negligible electronic conductivity and suitable for solid electrolyte battery systems.

EXAMPLE 3

A solid electrolyte pellet consisting of LiI containing 0.2 mole % $CaI_2$ was prepared according to the procedure of Example 1.

A test cell was made according to the following system,

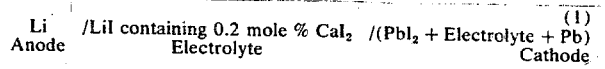

(1) A mixture of $PbI_2$, electrolyte, and Pb powder. This cell was tested; the conductivity was found to be $(2 \pm 0.5) \times 10^{-6}$ ohm$^{-1}$ cm$^{-1}$. This electrolyte is practically a purely ionic conductor of negligible electronic conductivity and suitable for solid electrolyte battery systems.

EXAMPLE 4

A solid electrolyte pellet consisting of LiI containing 10 mole % CaO was prepared according to the procedure of Example 1.

A test cell was made according to the following system,

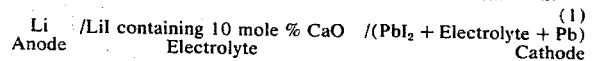

(1) A mixture of $PbI_2$, electrolyte, and Pb powder. This cell was tested; the conductivity was found to be $(5 \pm 2) \times 10^{-6}$ ohm$^{-1}$ cm$^{-1}$. This electrolyte is practically a purely ionic conductor of negligible electronic conductivity and suitable for solid electrolyte battery systems.

EXAMPLE 5

A solid electrolyte pellet consisting of LiI containing 4 mole % $CaI_2$ was prepared according to the procedure of Example 1.

A test cell was made according to the following system,

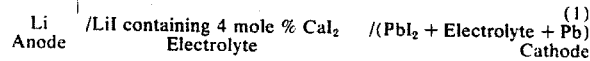

(1) A mixture of $PbI_2$, electrolyte, and Pb powder. This cell was tested; the conductivity was found to be $(8 \pm 2) \times 10^{-6}$ ohm$^{-1}$ cm$^{-1}$. This electrolyte is practically a purely ionic conductor of negligible electronic conductivity and suitable for solid electrolyte battery systems.

EXAMPLE 6

A solid electrolyte pellet consisting of LiI containing 15 mole % $CaCl_2$ was prepared according to the procedure of Example 1.

A test cell was made according to the following system,

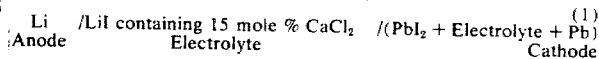

(1) A mixture of $PbI_2$, electrolyte, and Pb powder. This cell was tested; the conductivity was found to be $(5 \pm 2) \times 10^{-6}$ ohm$^{-1}$ cm$^{-1}$. This electrolyte is practically a purely ionic conductor of negligible electronic conductivity and suitable for solid electrolyte battery systems.

EXAMPLE 7

A solid electrolyte pellet consisting of LiI containing 2 mole % $BaI_2$ was prepared according to the procedure of Example 1.

A test cell was made according to the following system,

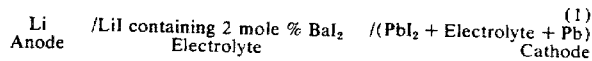

(1) A mixture of $PbI_2$, electrolyte, and Pb powder. This cell was tested; the conductivity was found to be $(2 \pm 1) \times 10^{-6}$ ohm$^{-1}$ cm$^{-1}$. This electrolyte is practically a purely ionic conductor of negligible electronic conductivity and suitable for solid electrolyte battery systems.

EXAMPLE 8

A solid electrolyte pellet consisting of LiI containing 20 mole % BaO was prepared according to the procedure of Example 1.

A test cell was made according to the following system,

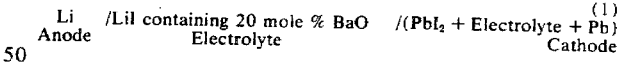

(1) A mixture of $PbI_2$, electrolyte, and Pb powder. This cell was tested; the conductivity was found to be $(5 \pm 2) \times 10^{-6}$ ohm$^{-1}$ cm$^{-1}$. This electrolyte is practically a purely ionic conductor of negligible electronic conductivity and suitable for solid electrolyte battery systems.

The superiority of the present invention is clearly demonstrated by the fact that the conductivity of the LiI plus additive solid electrolytes of this invention ranges from $2 \times 10^{-7}$ to $2 \times 10^{-5}$ ohm$^{-1}$ cm$^{-1}$, while the conductivity of pure LiI is $10^{-7}$ ohm$^{-1}$ cm$^{-1}$. Hence the presence in the alkali metal halide matrix of additives for introducing cationic defects thereinto, results in a substantially improved conductivity of the pure alkali metal halide solid electrolyte.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

What is claimed is:

1. A solid state battery comprising an alkali metal anode; a cathode comprising a mixture consisting of a heavy metal, the iodide thereof, and the solid electrolyte material, said heavy metal selected from the group consisting of Sn, Cu and Pb; and a solid electrolyte material disposed between said anode and said cathode, said solid electrolyte material consisting of an alkali metal halide matrix containing an additive for introducing defects into the matrix, said additive consisting of a salt selected from the group consisting of $CaI_2$, $CaO$, $CaCl_2$, $BaI_2$, $BaO$, $BeI_2$, $BeCl_2$, $MgI_2$, $MgCl_2$, $BaCl_2$, $SrI_2$, and $SrCl_2$, and said alkali metal halide having the same alkali metal as that forming the anode.

2. A solid state battery as in claim 1 wherein the solid electrolyte matrix contains up to 20 mole percent of the additive.

3. A solid state battery as in claim 1 wherein the conductivity of the solid electrolyte material ranges from $2 \times 10^{-7}$ ohm$^{-1}$ cm$^{-1}$ to $2 \times 10^{-5}$ ohm$^{-1}$ cm$^{-1}$ at room temperature.

4. A solid state battery comprising a lithium anode; a cathode comprising a mixture consisting of a heavy metal, the iodide thereof, and the solid electrolyte material, said heavy metal selected from the group consisting of Sn, Cu and Pb; and a solid electrolyte material disposed between said anode and said cathode, said solid electrolyte material consisting of a lithium iodide matrix containing an additive for introducing defects into the matrix, said additive consisting of a salt selected from the group consisting of $CaI_2$, $CaO$, $CaCl_2$, $BaI_2$, $BaO$, $BeI_2$, $BeCl_2$, $MgI_2$, $MgCl_2$, $BaCl_2$, $SrI_2$, and $SrCl_2$.

5. A solid state battery as in claim 4 wherein said solid electrolyte matrix contains up to 20 mole percent of the additive.

6. A solid state battery as in claim 5 wherein the conductivity of the solid electrolyte material ranges from $2 \times 10^{-7}$ to $2 \times 10^{-5}$ ohm$^{-1}$ cm$^{-1}$ at room temperature.

* * * * *